(12) United States Patent
Hozumi et al.

(10) Patent No.: US 8,567,126 B2
(45) Date of Patent: Oct. 29, 2013

(54) VEHICLE DOOR STRUCTURE HAVING A SLIDE MECHANISM

(75) Inventors: Mamoru Hozumi, Kariya (JP); Yoshio Ojima, Kariya (JP); Tetsuro Otobe, Kariya (JP); Hiroshi Naito, Kariya (JP); Naoki Ishimaru, Kariya (JP); Mitsunori Hyodo, Kariya (JP); Yuji Yamanashi, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 13/391,986

(22) PCT Filed: Aug. 23, 2010

(86) PCT No.: PCT/JP2010/064204
§ 371 (c)(1),
(2), (4) Date: Feb. 23, 2012

(87) PCT Pub. No.: WO2011/024767
PCT Pub. Date: Mar. 3, 2011

(65) Prior Publication Data
US 2012/0167468 A1    Jul. 5, 2012

(30) Foreign Application Priority Data
Aug. 27, 2009    (JP) .................. 2009-196170

(51) Int. Cl.
*E05F 11/00*    (2006.01)
*E05F 11/52*    (2006.01)
*E05D 15/10*    (2006.01)
*E05D 15/48*    (2006.01)

(52) U.S. Cl.
USPC .................. 49/360; 49/209; 49/163; 49/143

(58) Field of Classification Search
USPC ........... 49/360, 209, 210, 211, 213–216, 221, 49/223–225, 163, 143; 296/155
See application file for complete search history.

(56) References Cited

U.S. PATENT DOCUMENTS 5,921,613 A * 7/1999 Breunig et al. ............... 296/155
6,422,287 B1 * 7/2002 Wilke ............................ 160/92
(Continued)

FOREIGN PATENT DOCUMENTS

FR    2 818 591 A1    6/2002
JP    10-147149 A    6/1998
(Continued)

OTHER PUBLICATIONS

Machine translation of FR2818591.*
(Continued)

*Primary Examiner* — Katherine Mitchell
*Assistant Examiner* — Scott Denion
(74) *Attorney, Agent, or Firm* — Sughrue Mion, PLLC

(57) ABSTRACT

A vehicle door structure provided with a first door panel, a second door panel, a slide mechanism, and a hinge mechanism. The slide mechanism is provided with a first slide rail, a second slide rail, a first guide body, and a second guide body. The first slide rail is provided to the vehicle body to extend along the upper part or the lower part of the first door panel that is in a fully closed position. The first guide body is provided to the first door panel and is guided by the first slide rail. The second slide rail is provided to the second door panel. The second guide body is provided to the first door panel and is guided by the second slide rail. When the first door panel is in a fully open position, the first guide body has been or can be separated from the first slide rail.

8 Claims, 12 Drawing Sheets

(56) References Cited

U.S. PATENT DOCUMENTS

| | | | |
|---|---|---|---|
| 6,471,284 B2 * | 10/2002 | Landmesser | 296/146.8 |
| 6,896,315 B2 * | 5/2005 | Batinli et al. | 296/155 |
| 7,073,847 B2 * | 7/2006 | Morrow et al. | 296/190.11 |
| 7,097,229 B1 * | 8/2006 | Chernoff | 296/146.1 |
| 7,438,346 B1 * | 10/2008 | Breed | 296/146.4 |
| 2001/0006298 A1 * | 7/2001 | Tsubokura et al. | 296/155 |
| 2003/0218358 A1 * | 11/2003 | Hahn | 296/155 |
| 2004/0123524 A1 | 7/2004 | Batinli et al. | |
| 2006/0000145 A1 * | 1/2006 | Yoshida et al. | 49/360 |
| 2006/0197357 A1 | 9/2006 | Catania | |
| 2007/0062118 A1 * | 3/2007 | Lindemann et al. | 49/209 |
| 2012/0073205 A1 * | 3/2012 | Hamaker et al. | 49/163 |

FOREIGN PATENT DOCUMENTS

| | | |
|---|---|---|
| JP | 2004-528216 A | 9/2004 |
| JP | 2006-240611 A | 9/2006 |

OTHER PUBLICATIONS

International Search Report of PCT/JP2010/064204, dated Nov. 22, 2010.

* cited by examiner

Vehicle Interior ←

Vehicle Exterior →

VEHICLE DOOR STRUCTURE HAVING A SLIDE MECHANISM

CROSS REFERENCE TO RELATED APPLICATIONS

This application is a National Stage of International Application No. PCT/JP2010/064204 filed Aug. 23, 2010, claiming priority based on Japanese Patent Application No. 2009-196170 filed Aug. 27, 2009 the contents of all of which are incorporated herein by reference in their entirety.

TECHNICAL FIELD

The present invention relates to a vehicle door structure, and particularly to a vehicle door structure having a composite door in which a sliding door and a swing door are combined.

BACKGROUND ART

A vehicle door system disclosed in Japanese Laid-Open Patent Publication No. 2006-240611 is known, for example. The vehicle door system in this publication has a first door panel and a second door panel, and the first door panel and the second door panel collaborate with each other and close a door opening in a vehicle body. The first door panel is relatively moved with respect to the second door panel and opens/closes a part of the door opening. Also, in this vehicle door system, the first door panel and the second door panel are relatively moved with respect to the vehicle body to open and close the whole of the door opening.

The first door panel slides in the horizontal direction along a pair of slide tracks provided on an upper part and a lower part of the second door panel. The second door panel is connected to the vehicle body through a hinge assembly, and the second door panel is rotatable around a vertical axis with respect to the vehicle body by using the hinge assembly as a fulcrum.

SUMMARY OF THE INVENTION

Problems that the Invention is to Solve

In the vehicle door system in Japanese Laid-Open Patent Publication No. 2006-240611, the first door panel is supported by the slide tracks provided on the second door panel and slides between the fully open position where the first door panel substantially overlap the second door panel and a fully closed position extended in the horizontal direction from the second door panel along the slide tracks. While the first door panel in the fully closed position begins to be moved toward the fully open position, the first door panel is supported by the slide tracks at a portion on one end side in the sliding direction, that is, at a portion far from the center of gravity of the first door panel in the sliding direction. Thus, in the first door panel, a moment around the horizontal axis is generated by the weight of the first door panel. Also, while the first door panel in the fully closed position begins to be moved toward the fully open position, if an external force is applied to the first door panel from the vehicle interior to the outside of the vehicle body, a moment around the vertical axis occurs in the first door panel. In order to reliably receive these moments by the slide tracks or the second door panel, rigidity of the slide tracks or the second door panel should be improved. However, if the slide tracks and the second door panel are reinforced in order to improve the rigidity thereof, the weights of the first door panel and the second door panel are increased, and opening/closing of these door panels become difficult.

An objective of the present invention is to provide a vehicle door structure in which a part of or the whole of the door opening can be opened/closed by a sliding type first door panel and a swing type second door panel and has rigidity higher than the prior-art doors.

Means for Solving the Problems

To achieve the foregoing objective and in accordance with one aspect of the present invention, a vehicle door structure is provided that includes a first door panel, a second door panel, a slide mechanism, and a hinge mechanism. The first door panel opens and closes a part of a door opening formed in a vehicle body. The second door panel opens and closes the whole of the door opening in collaboration with the first door panel. The slide mechanism slides the first door panel with respect to the second door panel. The hinge mechanism supports the second door panel such that the second door panel is capable of axial rotation with respect to the vehicle body. In its fully open state, the first door panel is arranged to overlap the second door panel. The slide mechanism includes a first slide rail, a first guide body, a second slide rail, and a second guide body. The first slide rail is provided in the vehicle body to extend along an upper part or a lower part of the first door panel in the fully closed state. The first guide body is provided in the first door panel and guided by the first slide rail. The second slide rail is provided in the second door panel. The second guide body is provided in the first door panel and guided by the second slide rail. When the first door panel is in the fully open state, the first guide body is in a state removed from the first slide rail or in a removable state.

BRIEF DESCRIPTION OF THE DRAWINGS

FIG. 3(*b*) is a cross-sectional view taken along line 3*b*-3*b* in FIG. 2;

FIG. 7(*b*) is a cross-sectional view taken along line 7*b*-7*b* in FIG. 7;

DETAILED DESCRIPTION OF THE PREFERRED EMBODIMENTS

Figure 1:
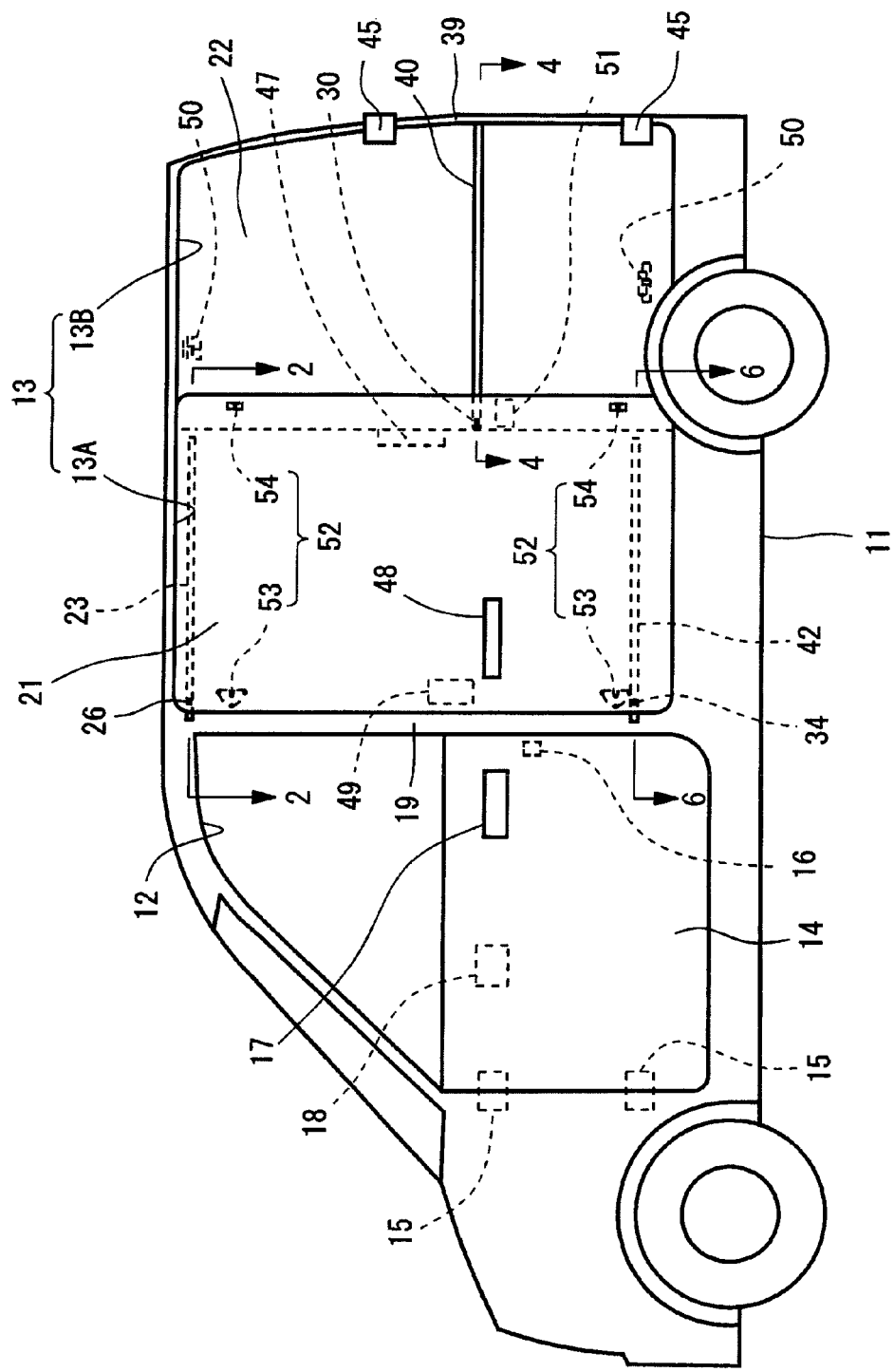
FIG. 1 is a side view of a vehicle provided with a vehicle door structure according to a first embodiment of the present invention.

A vehicle door structure according to a first embodiment of the present invention will be described below by referring to the attached drawings. The vehicle door structure of this embodiment is applied to a side part of a vehicle body 11. In FIG. 1, the left side corresponds to the front of the vehicle and the right side corresponds to the rear of the vehicle. As illustrated in FIG. 1, a front door opening 12 located on the side of the front seats and a rear door opening 13 located on the rear of the front seats are formed on the side face of the vehicle body 11.

The front door opening 12 is opened and closed by a front door panel 14. The front door panel 14 is connected to the vehicle body 11 by a pair of upper and lower hinge mechanisms 15. The hinge mechanisms 15 are provided with a fulcrum shaft (not shown) extending vertically. The front door panel 14 swings around the fulcrum shaft as the center and opens/closes the front door opening 12. A front door lock mechanism 16 is provided between the front door panel 14 and the vehicle body 11. The front door lock mechanism 16 connects the front door panel 14 to the vehicle body 11 and fully closes the front door opening 12. The front door lock mechanism 16 is provided with a latch (not shown) and a door lock striker (not shown) and keeps the front door panel 14 in the fully closed state by means of connection between the latch and the door lock striker. The front door panel 14, which fully closes the front door opening 12, can be opened from outside the vehicle by operating an outer handle 17 provided on the outer face of the front door panel 14. Also, the front door panel 14 in the fully closed state can be opened from inside the vehicle by operating an inner handle 18 provided on the inner face (face exposed into the vehicle interior) of the front door panel 14.

The rear door opening 13 is formed on the side of a luggage compartment provided in the rear of the front seats. The rear door opening 13 is opened and closed by a vehicle door mechanism provided with a slide opening/closing type first door panel 21 and a swing opening/closing type second door panel 22. In the rear door opening 13, a region closed by the first door panel 21 is referred to as a first door opening region 13A, and a region closed by the second door panel 22 is referred to as a second door opening region 13B. The first door panel 21 and the second door panel 22 collaborate with each other to open/close the whole rear door opening 13. The first door panel 21 slides in the front-rear direction of the vehicle body 11 and opens/closes the first door opening region 13A. The first door panel 21 is located outside the second door panel 22 in the fully open state and overlaps the second door panel 22. The first door panel 21 moves in the front-rear direction of the vehicle body 11 with respect to the vehicle body 11 and the second door panel 22 through the slide mechanism.

Figure 2:
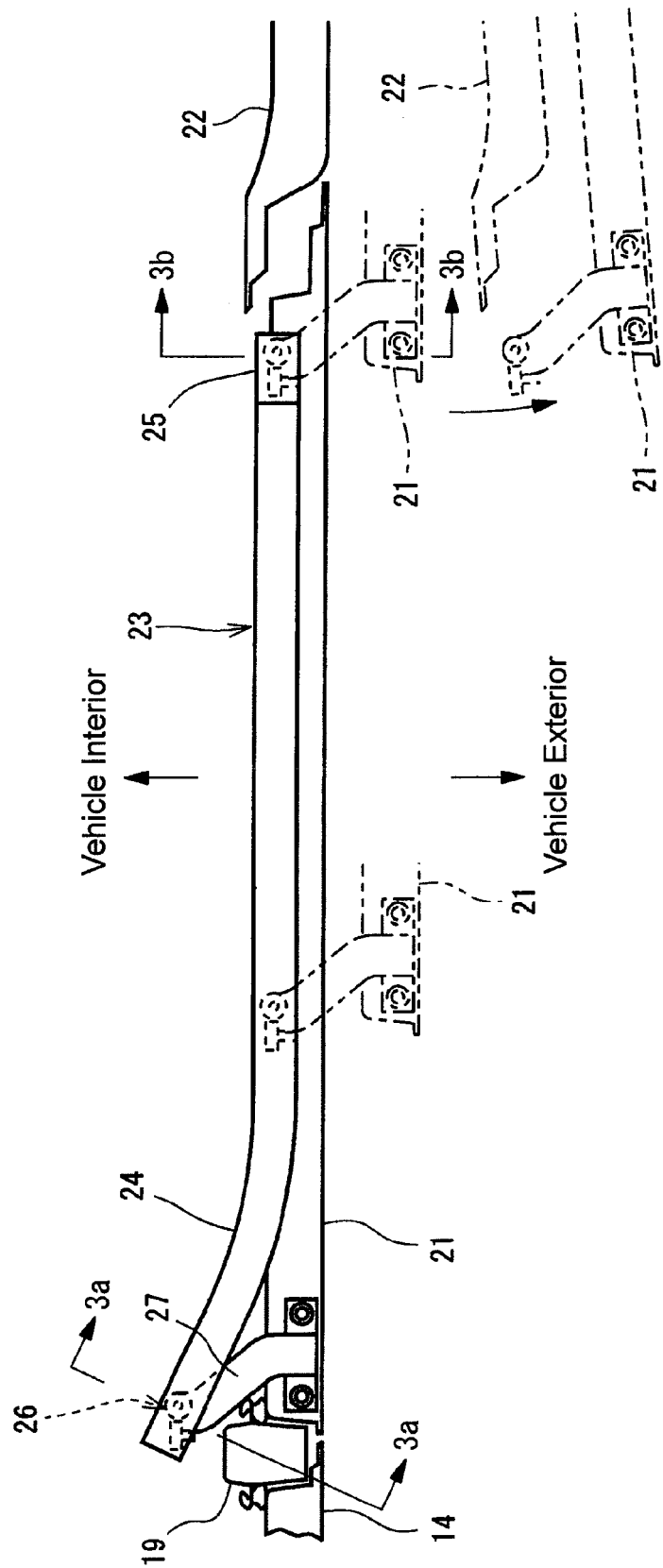
FIG. 2 is a diagram as viewed in the direction of arrow 2-2 in FIG. 1.
Figure 3A:
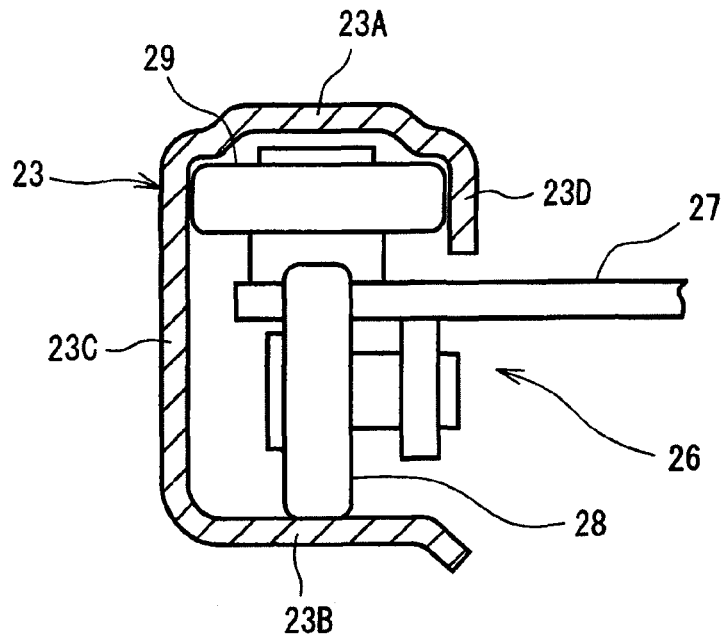
FIG. 3(*a*) is a cross-sectional view taken along line 3*a*-3*a* in FIG. 2.
Figure 3B:
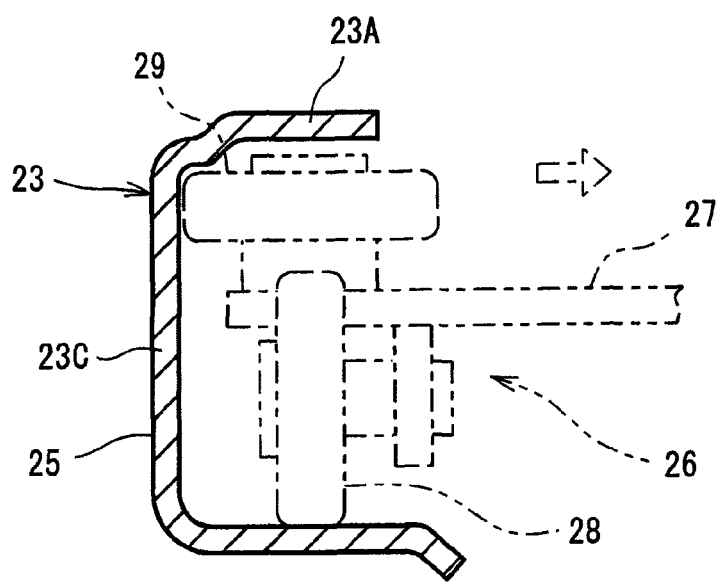

The slide mechanism is provided with an upper slide rail 23 as a first slide rail, an intermediate slide rail 40 as a second slide rail, and a lower slide rail 42 as a third slide rail. Also, the slide mechanism is provided with a first guide body 26 guided by the upper slide rail 23, a second guide body 30 guided by the intermediate slide rail 40, and a third guide body 34 guided by the lower slide rail 42. As illustrated in FIG. 2, an upper arm 27 extends from a position close to the front edge on the upper part of the first door panel 21 toward the vehicle body 11, and the first guide body 26 is provided at the distal end of this upper arm 27. As illustrated in FIGS. 3(a) and 3(b), the first guide body 26 is provided with a radial roller 28 and a thrust roller 29, and the rollers 28 and 29 are guided along the upper slide rail 23. The rotational axis of the radial roller 28 extends horizontally, and the rotational axis of the thrust roller 29 extends vertically.

The upper slide rail 23 is provided on a roof side rail ceiling portion of the vehicle body 11 located above the first door opening region 13A and extends along the upper part of the first door panel 21 in the fully closed state. The upper slide rail 23 is a rail that guides the first guide body 26 provided in the first door panel 21 and restricts movement of the first guide body 26 in the up-down direction and the left-right direction of the vehicle body 11. As illustrated in FIG. 3(a), the upper slide rail 23 is provided with a rail upper face portion 23A, a rail lower face portion 23B, a rail side face portion 23C, and a rail outer edge portion 23D, and the shape of a cross-section is a channel shape. The radial roller 28 rolls on the rail lower face portion 23B in accordance with the movement of the first door panel 21. The rail side face portion 23C and the rail outer edge portion 23D restrict the movement of the thrust roller 29 in the left-right direction of the vehicle body 11.

As illustrated in FIG. 2, the longitudinal direction of the upper slide rail 23 matches the front-rear direction of the vehicle body 11. The front end of the upper slide rail 23 is located in the vicinity of a pillar 19 located between the front door panel 14 and the first door panel 21. The rear end of the upper slide rail 23 is located in the vicinity of the front edge of the second door panel 22. The upper slide rail 23 is provided with a curved rail portion 24 in a predetermined range close to the front end. When the first door panel 21 in the state overlapped with the second door panel 22 is made to slide to the front of the vehicle body 11, the first guide body 26 is guided by the curved rail portion 24, and thus the first door panel 21 is moved to a position where the outer face thereof becomes flush with the outer face of the second door panel 22 and closes the first door opening region 13A. As illustrated in FIG. 3(b), in the rear end of the upper slide rail 23, a cutout rail portion 25 not having a rail outer edge portion 23D is formed. While the first guide body 26 is located in the cutout rail portion 25, the first guide body 26 can be removed from the upper slide rail 23 and can be separated from the vehicle body 11.

Figure 4:
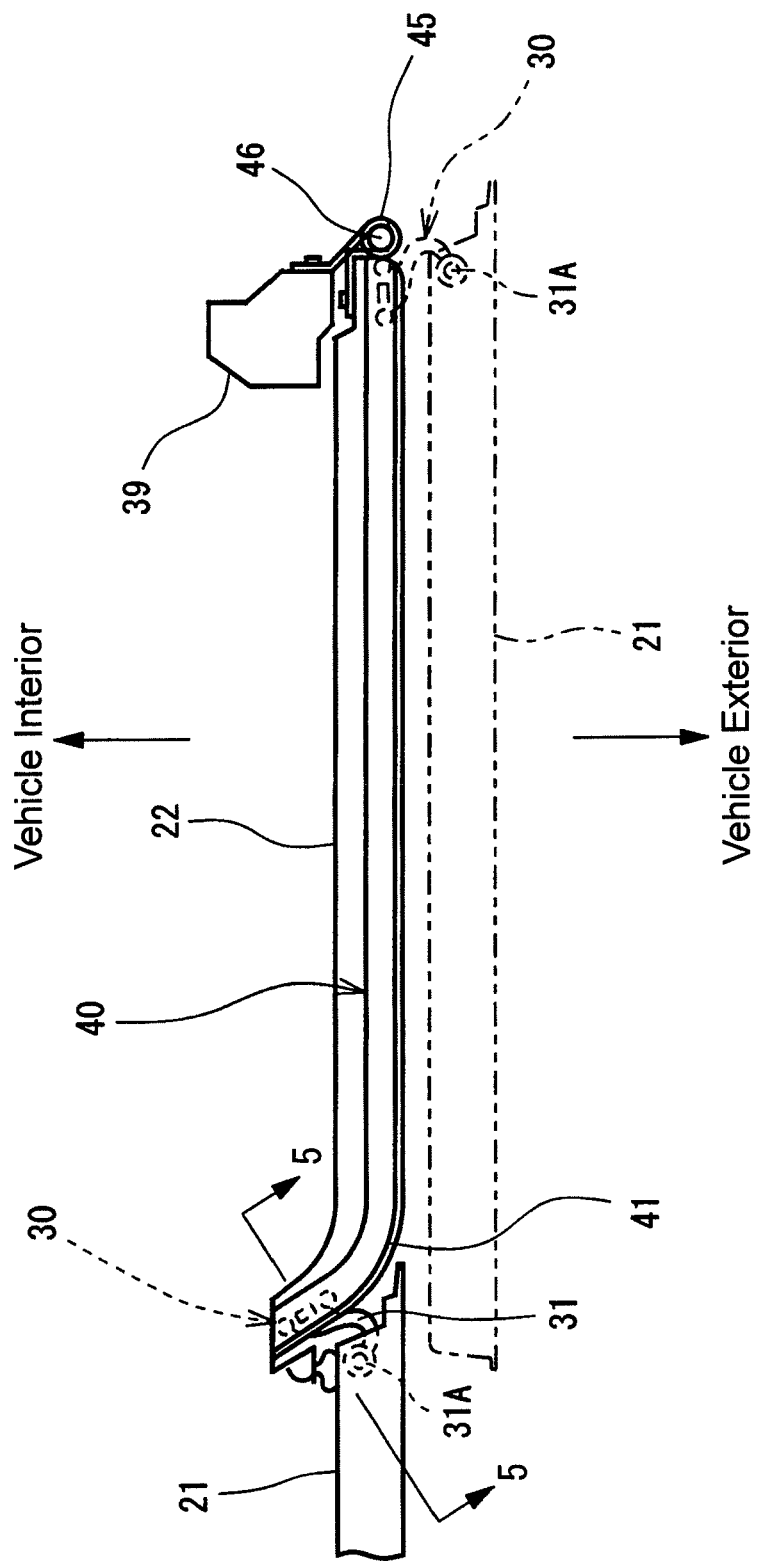
FIG. 4 is a diagram as viewed in the direction of arrow 4-4 in FIG. 1.
Figure 5:
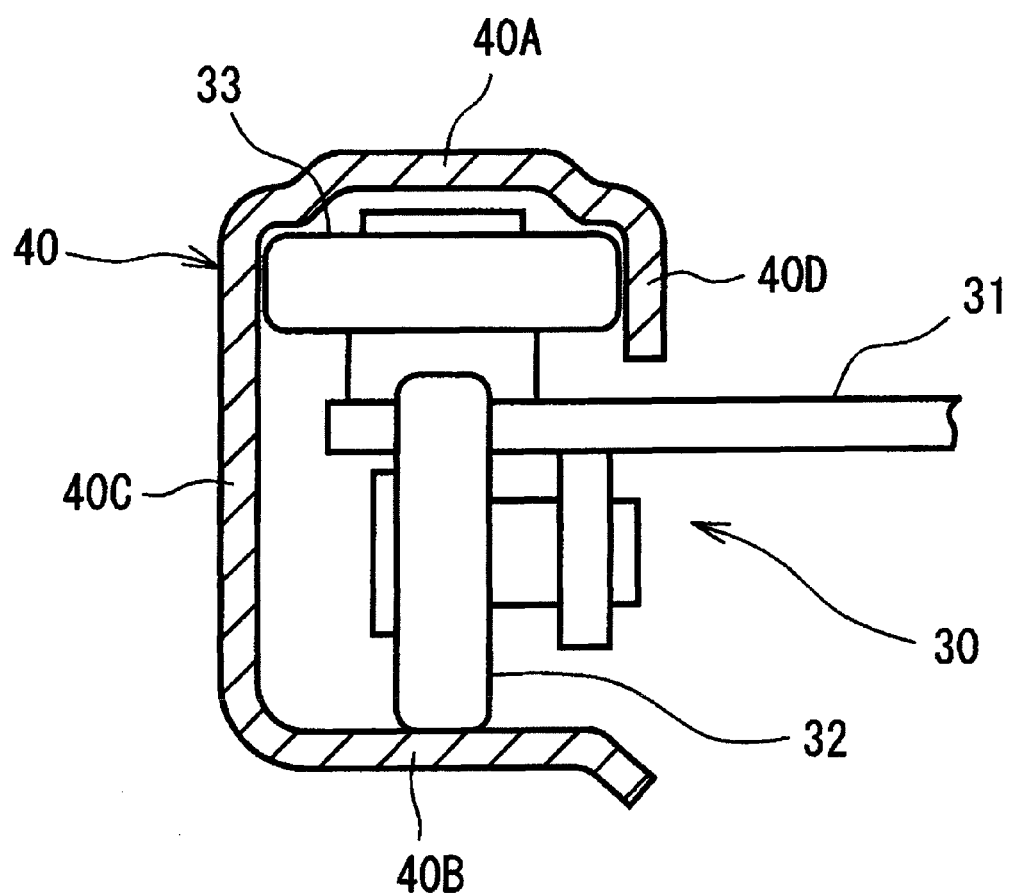
FIG. 5 is a cross-sectional view taken along line 5-5 in FIG. 4.

As illustrated in FIGS. 1 and 4, an intermediate arm 31 extending toward the vehicle body 11 is provided in an intermediate portion in the up-down direction of the first door panel 21 and close to the rear edge of the first door panel 21. The second guide body 30 is provided at the distal end of this intermediate arm 31. As illustrated in FIG. 5, the second guide body 30 is provided with a radial roller 32 and a pair of front and rear thrust rollers 33, and the rollers 32 and 33 are guided along the intermediate slide rail 40. In FIG. 5, only the thrust roller 33 located in the front in the pair of thrust rollers 33 is illustrated. The rotational axis of the radial roller 32 extends horizontally, and the rotational axis of the thrust rollers 33 extends vertically. The intermediate arm 31 is provided rotatably in the left-right direction with respect to the first door panel 21 with a rotary shaft 31A as a fulcrum.

The intermediate slide rail 40 is provided in an intermediate portion in the up-down direction on the outer face of the second door panel 22, and the longitudinal direction of the intermediate slide rail 40 matches the front-rear direction of the vehicle body 11. As illustrated in FIG. 4, the front end of the intermediate slide rail 40 is located at the front edge of the second door panel 22, and the rear end of the intermediate slide rail 40 is located at the rear edge of the second door panel 22. That is, the intermediate slide rail 40 is provided to cross the outer face of the second door panel 22 in the front-rear direction.

The intermediate slide rail 40 is a rail that guides the second guide body 30 provided in the first door panel 21 and restricts the movement of the second guide body 30 in the up-down direction and the left-right direction of the vehicle body 11. As illustrated in FIG. 5, the intermediate slide rail 40 is provided with a rail upper face portion 40A, a rail lower face portion 40B, a rail side face portion 40C, and a rail outer edge portion 40D similarly to the upper slide rail 23, and the shape of the cross-section is a channel shape. The intermediate slide rail 40 is provided with a curved rail portion 41 in a predetermined range close to the front end thereof. When the first door panel 21 in the state overlapped with the second door panel 22 is made to slide to the front of the vehicle body 11, the second guide body 30 is guided along the curved rail portion 41, and the first door panel 21 is moved to a position where the outer face thereof becomes flush with the outer face of the second door panel 22 and closes the first door opening region 13A. The curvature of the curved rail portion 41 of the intermediate slide rail 40 is set larger than the curvature of the curved rail portion 24 of the upper slide rail 23. The second guide body 30 is smoothly moved in the intermediate slide rail 40 including the curved rail portion 41 by means of rotation of the intermediate arm 31 with respect to the second door panel 22.

Figure 6:
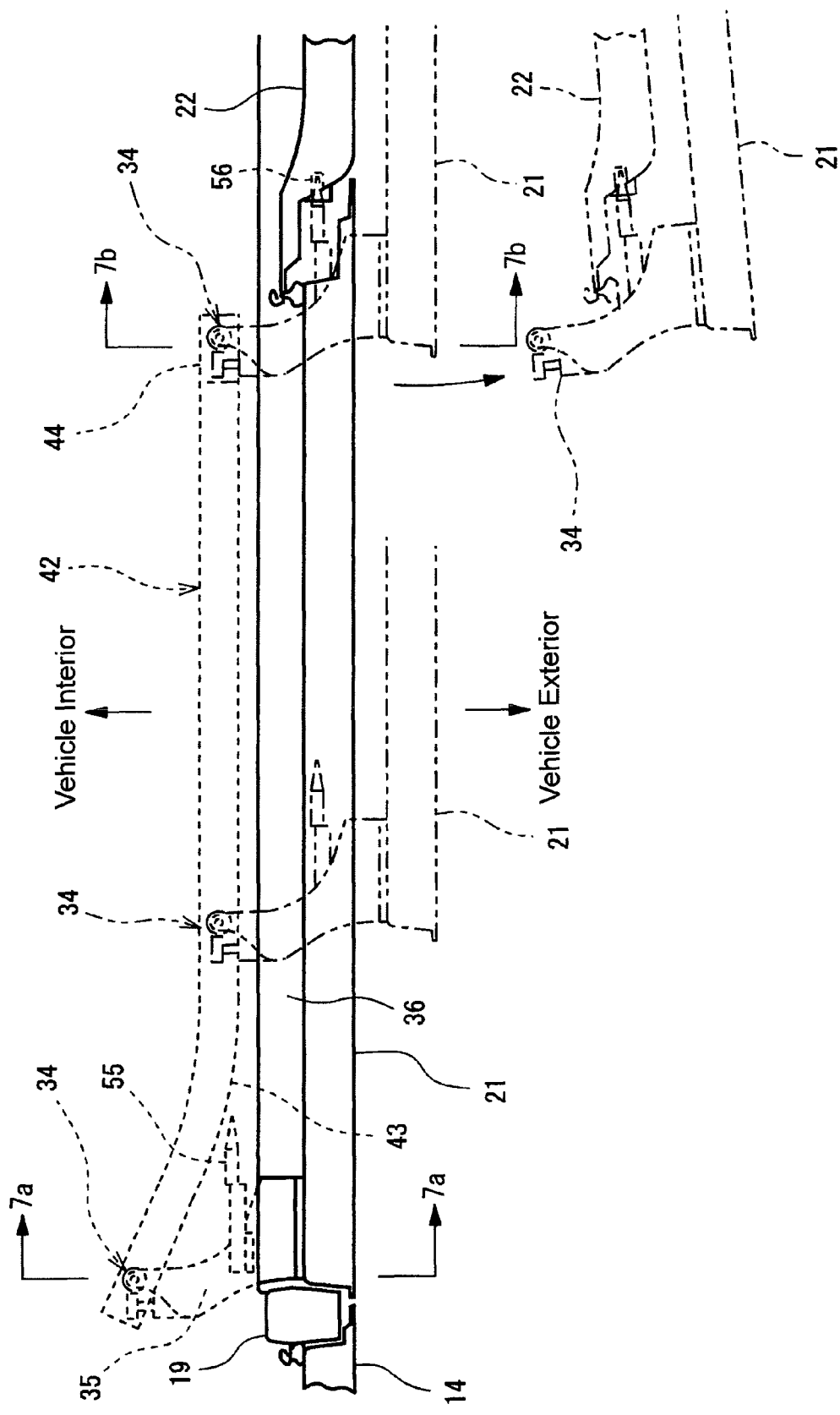
FIG. 6 is a cross-sectional view taken along line 6-6 in FIG. 1.
Figure 7A:
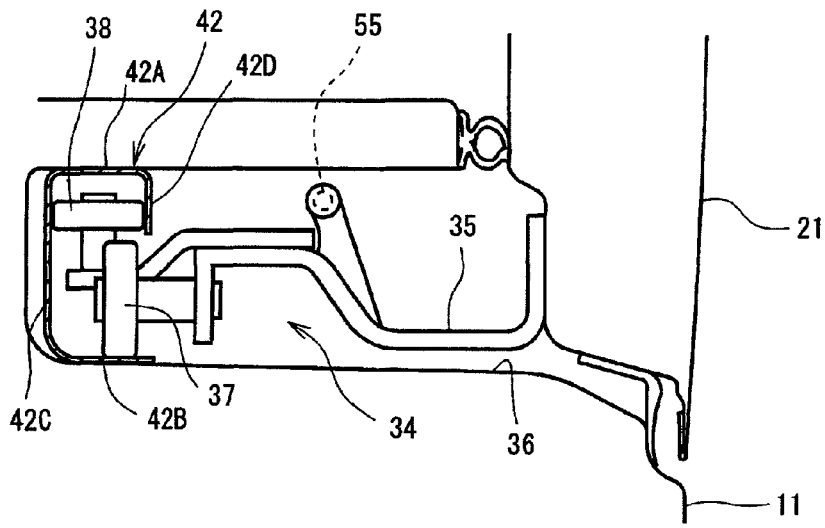
FIG. 7(*a*) is a cross-sectional view taken along line 7*a*-7*a* in FIG. 6.
Figure 7B:
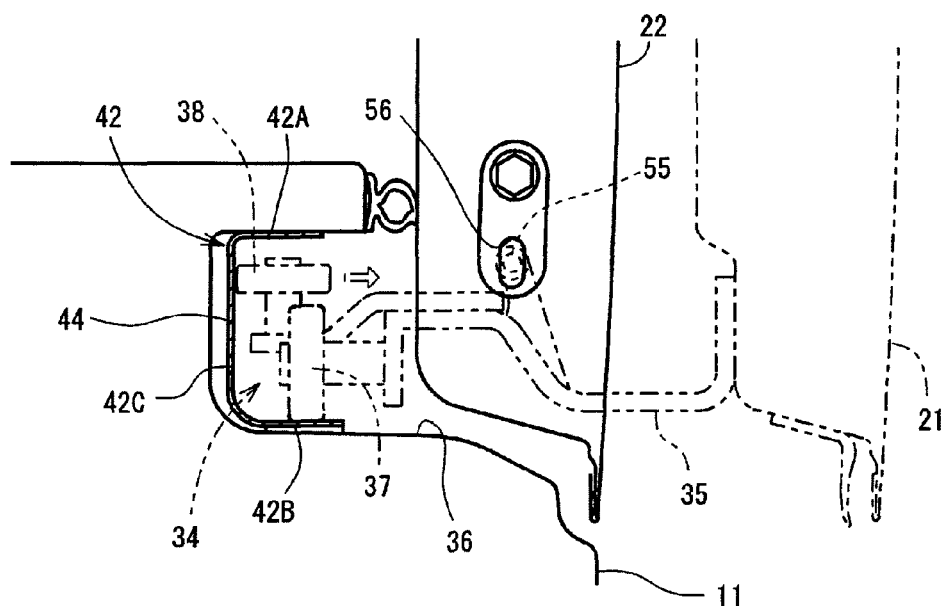

As illustrated in FIGS. 1 and 6, a lower arm 35 extends from a portion close to the front edge of the lower part of the first door panel 21 toward the vehicle body 11 across a step 36, and the third guide body 34 is provided at the distal end of the lower arm 35. As illustrated in FIGS. 7(a) and 7(b), the third guide body 34 is provided with a radial roller 37 and a thrust roller 38, and the rollers 37 and 38 are guided along the lower slide rail 42. The rotational axis of the radial roller 37 extends horizontally, and the rotational axis of the thrust roller 38 extends vertically.

As illustrated in FIG. 6, the lower slide rail 42 is provided at a position close to the floor of the vehicle body 11 on the lower side of the first door opening region 13A to follow the lower part of the first door panel 21 in the fully closed state. The lower slide rail 42 is a rail that guides the third guide body 34 of the first door panel 21 and restricts the movement of the third guide body 34 in the up-down direction and the left-right direction of the vehicle body 11. As illustrated in FIGS. 7(a) and 7(b), the lower slide rail 42 is provided with a rail upper face portion 42A, a rail lower face portion 42B, a rail side face portion 42C, and a rail outer edge portion 42D similarly to the upper slide rail 23. The radial roller 37 rolls on the rail lower face portion 42B in accordance with the movement of the first door panel 21. The rail side face portion 42C and the rail outer edge portion 42D restrict the movement of the thrust roller 38 in the left-right direction of the vehicle body 11.

The longitudinal direction of the lower slide rail 42 matches the front-rear direction of the vehicle body 11, and the front end of the lower slide rail 42 is located in the vicinity of the pillar 19 located between the front door panel 14 and the first door panel 21, and the rear end of the lower slide rail 42 is located in the vicinity of the front edge of the second door panel 22. The lower slide rail 42 is provided with a curved rail portion 43 in a predetermined range close to the front end thereof. When the first door panel 21 in the state overlapped with the second door panel 22 is made to slide to the front of the vehicle body 11, the third guide body 34 is guided by the curved rail portion 43, and the first door panel 21 is moved to a position where the outer face thereof becomes flush with the outer face of the second door panel 22 and closes the first door opening region 13A. At the rear end of the lower slide rail 42, a cutout rail portion 44 not having the rail outer edge portion 42D is formed. The third guide body 34 can be removed from the lower slide rail 42 and separated from the vehicle body 11 while the third guide body 34 is located in the cutout rail portion 44.

As illustrated in FIGS. 1 and 4, the second door panel 22 is connected to the vehicle body 11 by a pair of hinge mechanisms 45. In this embodiment, the hinge mechanisms 45 are provided at a portion corresponding to the intermediate slide rail 40 of the second door panel 22 and a portion corresponding to the lower part of the second door panel 22 in a rear pillar 39. The second door panel 22 is rotatable with respect to the vehicle body 11 through the hinge mechanisms 45 in a state in which the first door panel 21 is fully open and overlapped with the second door panel 22. As illustrated in FIG. 4, the hinge mechanism 45 is provided with a fulcrum shaft 46 extending vertically, and the second door panel 22 is axially rotated with the fulcrum shaft 46 as a fulcrum and opens/closes the rear door opening 13.

A second door opening/closing restricting mechanism 50 is provided between the second door panel 22 and the vehicle body 11. In this embodiment, as illustrated in FIG. 1, the second door opening/closing restricting mechanism 50 is provided at positions corresponding to the upper part and the lower part of the second door panel 22, respectively. The second door opening/closing restricting mechanisms 50 connects the second door panel 22 to the vehicle body 11 and fully closes the second door opening region 13B. The second door opening/closing restricting mechanism 50 is provided with a latch (not shown) provided in the second door panel 22 and a door lock striker (not shown) provided in the vehicle body 11 and keeps the second door panel 22 in the fully closed state by means of connection between the latch and the door lock striker. An opening/closing handle 47 is provided at the front edge portion of the second door panel 22. The connection between the second door panel 22 and the vehicle body 11 held by the second door opening/closing restricting mechanisms 50 is cancelled by means of an operation of the opening/closing handle 47, whereby the second door panel 22 can be opened/closed. The opening/closing handle 47 can cancel the connection by means of the second door opening/closing restricting mechanism 50 only when the first door panel 21 is in the fully open state overlapping with the second door panel 22 and also if the second door panel 22 is in the fully closed state. That is, if the first door panel 21 is in a state other than fully open, the connection between the second door panel 22 and the vehicle body 11 is not cancelled by the second door opening/closing restricting mechanisms 50 even if the opening/closing handle 47 is operated.

As illustrated in FIG. 1, a first door opening/closing restricting mechanism 51 is provided between the first door panel 21 and the second door panel 22. The first door opening/closing restricting mechanism 51 connects the first door panel 21 in the fully closed state to the second door panel 22. The first door opening/closing restricting mechanism 51 is provided with a latch (not shown) provided at the rear edge of the first door panel 21 and a door lock striker (not shown) provided at the front edge of the second door panel. If the first door panel 21 is in the fully closed state, the sliding movement of the first door panel 21 with respect to the vehicle body 11 and the second door panel 22 is restricted by means of connection between the latch and the door lock striker of the first door opening/closing restricting mechanism 51 to each other. An outer handle 48 is provided on the outer face of the first door panel 21, and an inner handle 49 is provided on the inner face of the first door panel 21. The connection between the first door panel 21 and the second door panel 22 by the first door opening/closing restricting mechanism 51 can be cancelled by means of operations of the outer handle 48 and the inner handle 49.

Figure 8:
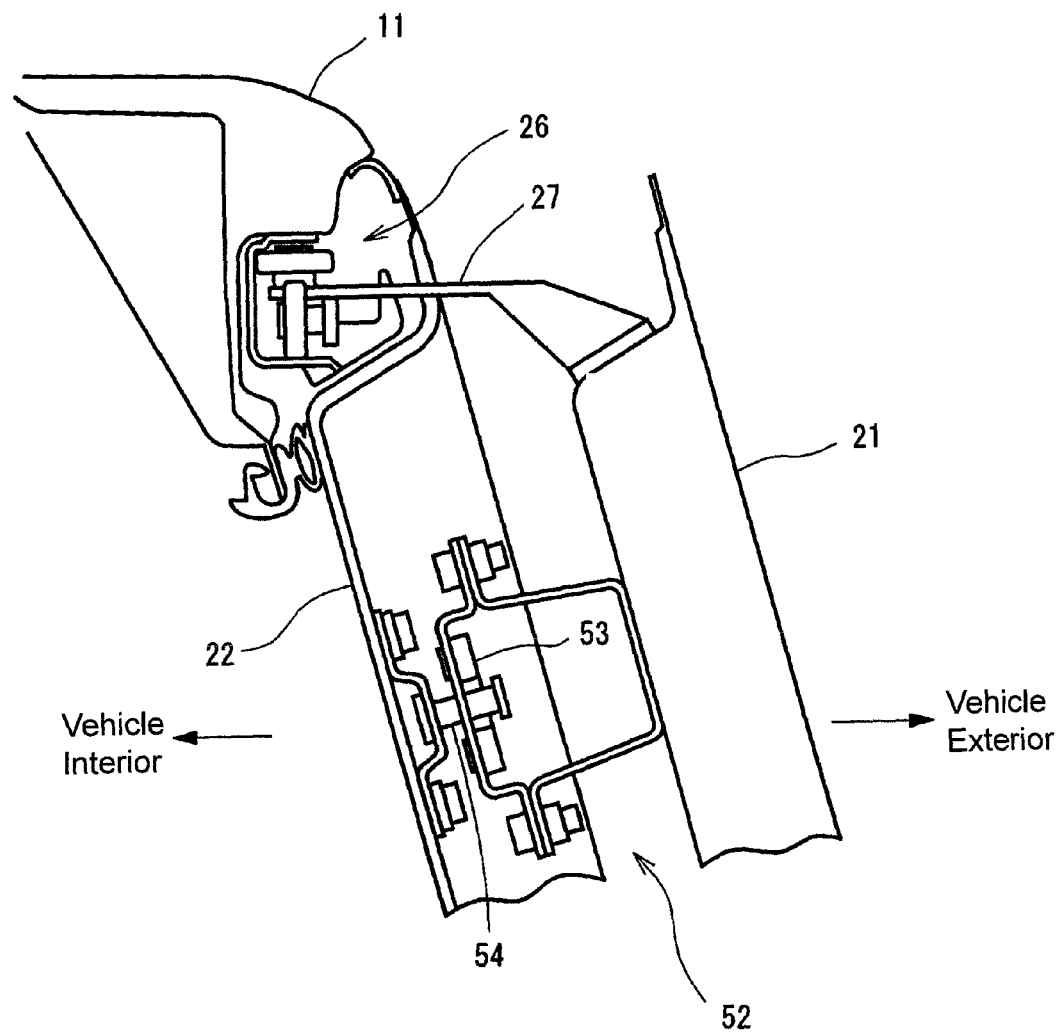
FIG. 8 is an enlarged view illustrating a slide restricting mechanism in the vehicle door structure in FIG. 1.

A slide restricting mechanism 52 is provided between the first door panel 21 and the second door panel 22. The slide restricting mechanism 52 connects the first door panel 21 in the fully open state overlapping the second door panel 22 to the second door panel 22. As illustrated in FIG. 8, the slide restricting mechanism 52 is provided with a latch 53 provided in the first door panel 21 and a door lock striker 54 provided in the second door panel 22. If the first door panel 21 is in the fully open state, by means of connection between the latch 53 and the door lock striker 54 to each other, the sliding movement of the first door panel 21 with respect to the second door panel 22 is restricted. In this embodiment, as illustrated in FIG. 1, a pair of upper and lower slide restricting mechanisms 52 is provided. The slide restricting mechanisms 52 have a function of restricting the movement of the first door panel 21 in the up-down direction and the left-right direction with respect to the second door panel 22. Also, the slide restricting mechanisms 52 have a function corresponding to a connecting lock mechanism that connects the first door panel 21 and the second door panel 22 to each other. The cancellation of the connection between the first door panel 21 and the second door panel 22 by the slide restricting mechanisms 52 is configured to be able to be realized by operations of the outer handle 48 and the inner handle 49 provided in the first door panel 21 only when the second door opening/closing restricting mechanisms 50 are not cancelled. If the second door panel 22 is in the open state, the connection between the first door panel 21 and the second door panel 22 by the slide restricting mechanism 52 is configured not to be cancelled.

As illustrated in FIGS. 6 and 7(a), a positioning pin 55 is provided in the lower arm 35. The distal end of the positioning pin 55 is directed rearward of the vehicle. Also, as illustrated in FIG. 7(b), a pin receiving hole 56 through which the positioning pin 55 can be inserted is provided at the front edge of the second door panel 22. If the first door panel 21 is slid with respect to the second door panel 22 so that the first door panel 21 becomes fully open, the positioning pin 55 is inserted through the pin receiving hole 56. As a result, the first door panel 21 is positioned with respect to the second door panel 22 in the up-down direction and the left-right direction of the vehicle body 11, and also, the movement of the first door panel 21 is restricted in the up-down direction and the left-right direction of the vehicle body 11. Therefore, the positioning pin 55 and the pin receiving hole 56 correspond to the connecting lock mechanism, which prevents the first door panel 21 from separating from the second door panel 22 in a direction (right and left direction of the vehicle body 11) at a right angle with the sliding direction thereof.

Subsequently, an operation of the vehicle door structure of this embodiment will be described. First, a case in which the first door panel 21 is to be fully opened from the state in which the first door panel 21 and the second door panel 22 are both fully closed, that is, the rear door opening 13 is covered by the first door panel 21 and the second door panel 22 will be described. If the first door panel 21 illustrated in FIG. 1 is in the fully closed state, the first door panel 21 is supported by the vehicle body 11 and the second door panel 22. Also, the first door opening/closing restricting mechanism 51 restricts the sliding movement of the first door panel 21 with respect to the second door panel 22. Moreover, the second door opening/closing restricting mechanism 50 restricts the opening/closing of the second door panel 22 with respect to the vehicle body 11. In this embodiment, the center of gravity G of the first door panel 21 is located at substantially the center of the first door panel 21.

Figure 9A:
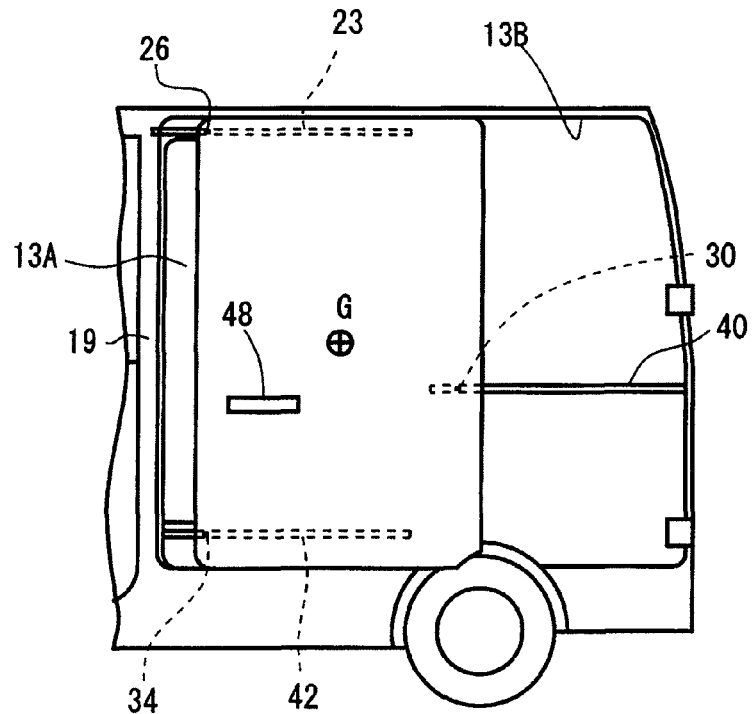
FIG. 9(*a*) is a side view of a vehicle illustrating the first door panel in a state in which the door begins to be opened FIG. 9(*b*) is a side view of the vehicle illustrating the first door panel in the fully open state.

The connection by the first door opening/closing restricting mechanism 51 is cancelled by means of the operation of the outer handle 48 or the inner handle 49, and the first door panel 21 is slid rearward of the vehicle body 11 with respect to the second door panel 22. The first guide body 26 is guided along the upper slide rail 23, the second guide body 30 is guided along the intermediate slide rail 40, and the third guide body 34 is guided along the lower slide rail 42. When the first door panel 21 begins to be opened, each of the guide bodies 26, 30, and 34 is guided along the corresponding curved rail portions 24, 41, and 43, and thus, the first door panel 21 is slid rearward while going outward of the vehicle body 11. When the first door panel 21 is moved from the fully closed state to the state of beginning to be opened illustrated in FIG. 9(a), the vicinity of the front edge of the first door panel 21 is connected to the vehicle body 11 through the first guide body 26 and the third guide body 34, and the vicinity of the rear edge of the first door panel 21 is connected to the second door panel 22 through the second guide body 30.

Also, in this state, the first guide body 26, which is guided by the upper slide rail 23, and the second guide body 30, which is guided by the intermediate slide rail 40, are located on both sides of the center of gravity G of the first door panel 21 in the sliding direction. Since the first guide body 26 and the third guide body 34 are located in front of the center of gravity G of the first door panel 21 and the second guide body 30 is located to the rear of the center of gravity G, the moment generated by the weight of the first door panel 21 can be successfully received by the slide rails 23, 40, and 42.

Also, the first guide body 26 and the third guide body 34 are located in the vicinity of the front edge of the first door panel 21, and the second guide body 30 is located in the vicinity of the rear edge end of the first door panel 21. Thus, even if an external force from inside the vehicle interior to the outside of the vehicle body 11 (in a direction at a right angle to the sliding direction of the first door panel 21) acts on the first door panel 21 in the state of beginning to be opened, for example, the moment by this external force can be favorably received through the guide bodies 26, 30, and 34 located in the vicinity of the front edge and in the vicinity of the rear edge of the first door panel 21, respectively.

Figure 9B:
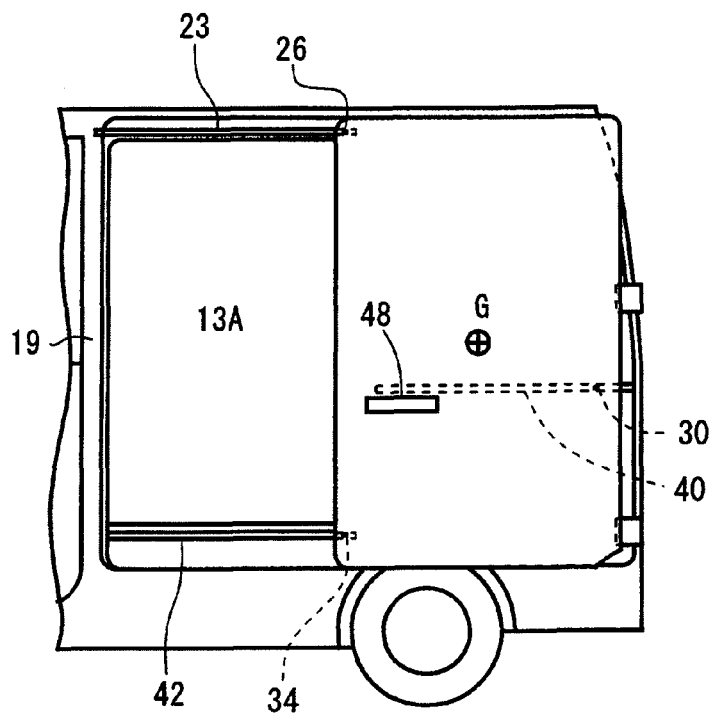

By sliding the first door panel 21 in the state of beginning to be opened to the rear of the vehicle body 11 with respect to the second door panel 22, the first door opening region 13A is enlarged while the first door panel 21 is overlapped with the second door panel 22. As illustrated in FIG. 9(b), if the rearward sliding movement of the first door panel 21 is completely finished, the first door opening region 13A is maximized, and the first door panel 21 is in the fully open state. When the first door panel 21 is fully open, the latch 53 provided in the first door panel 21 is connected to the door lock striker 54, which is provided in the second door panel 22. The connection between the latch 53 and the door lock striker 54, which constitute the slide restricting mechanism 52, restricts the sliding movement of the first door panel 21 with respect to the second door panel 22.

Also, when the rearward sliding movement of the first door panel 21 is completely finished, the positioning pin 55 provided in the lower arm 35 is inserted through the pin receiving hole 56, and the first door panel 21 is positioned in the left-right direction with respect to the second door panel 22, and the movement in the left-right direction of the first door panel 21 is restricted.

When the rearward sliding movement of the first door panel 21 is completely finished, the first guide body 26 becomes removable from the upper slide rail 23, though it has not been removed yet. The first guide body 26 is guided by the upper slide rail 23 until the first door panel 21 is brought into the fully open state. The rail side face portion 23C and the rail outer edge portion 23D of the upper slide rail 23 restrict the movement of the radial roller 28 in the first guide body 26 in the left-right direction of the vehicle body 11. Thus, the first guide body 26 is not removed from the upper slide rail 23 until the first door panel 21 is brought into the fully open state. On the other hand, when the rearward sliding movement of the first door panel 21 is completely finished, the first guide body 26 is located in the cutout rail portion 25 not having the rail outer edge portion 23D, and thus, the first guide body 26 is removable from the upper slide rail 23. Also, since the cutout rail portion 44 is formed in the lower slide rail 42 similarly to the upper slide rail 23, when the rearward sliding movement of the first door panel 21 is completely finished, the third guide body 34 becomes removable from the lower slide rail 42.

Since the intermediate slide rail 40 is not provided with the cutout rail portion, even if the first door panel 21 is in the fully open state, the second guide body 30 cannot be removed from the intermediate slide rail 40, and the rail outer edge portion 40D of the intermediate slide rail 40 prevents removal of the second guide body 30. As described above, while the first door panel 21 is fully open, the connection of the first guide body 26 and the third guide body 34 to the vehicle body 11 is cancelled, and the connection between the first door panel 21 and the second door panel 22 is maintained. That is, the connection between the first door panel 21 and the second door panel 22 is maintained by the connection between the second guide body 30 and the intermediate slide rail 40 and the slide restricting mechanism 52. The connection between the first door panel 21 and the second door panel 22 by the slide restricting mechanism 52 is cancelled by operating the outer handle 48 or the inner handle 49 from this state, and the first door panel 21 can be made to slide to the front of the vehicle body 11 with respect to the second door panel 22.

Figure 10:
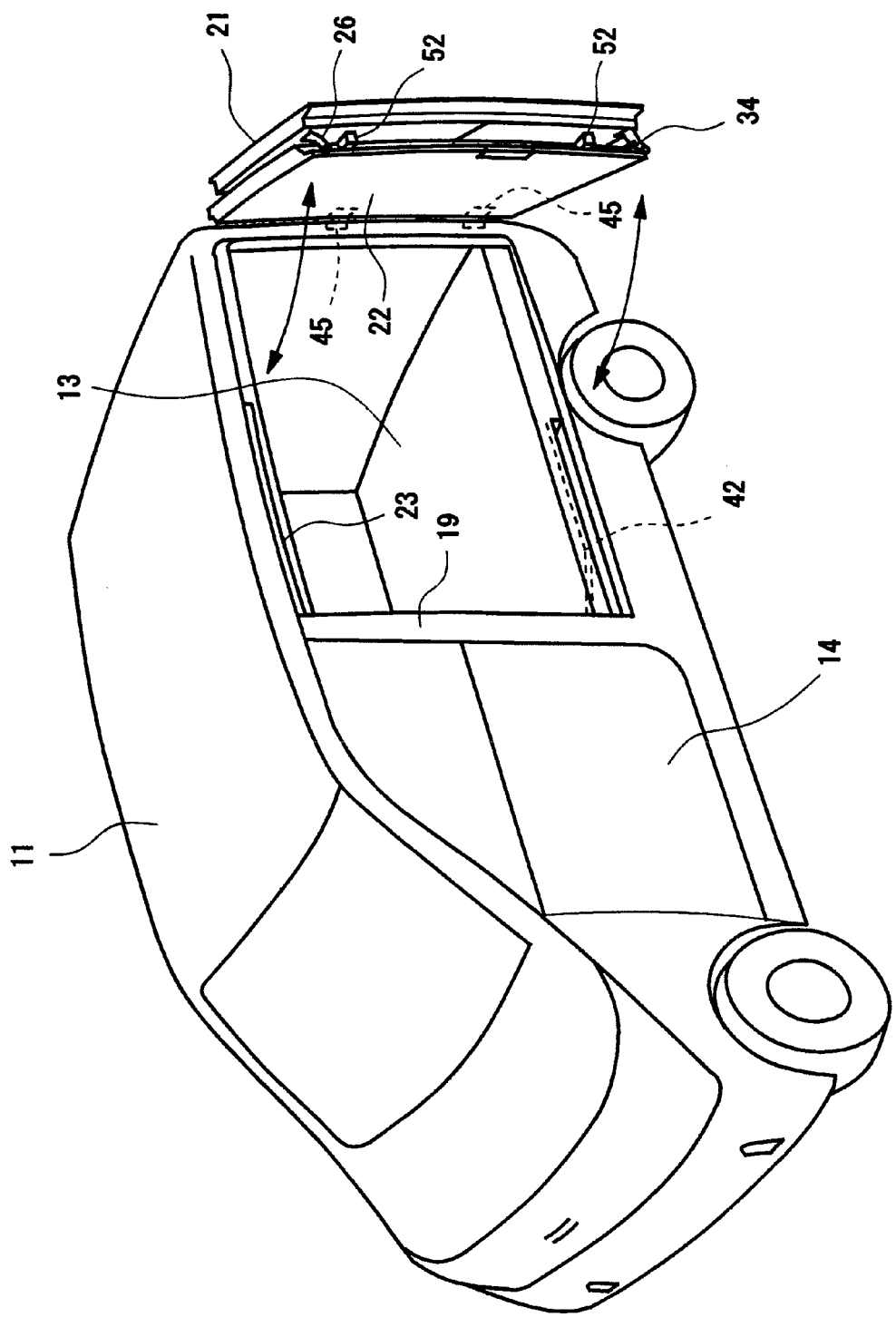
FIG. 10 is a perspective view of the vehicle illustrating a second door panel in the fully open state.

If the first door panel 21 is fully open and the second door panel 22 is fully closed, the connection between the vehicle body 11 and the second door panel 22 by the second door opening/closing restricting mechanism 50 can be cancelled by operating the opening/closing handle 47. By canceling the connection by the second door opening/closing restricting mechanism 50, the second door panel 22 can be opened with respect to the vehicle body 11 by axial rotation using the fulcrum shaft 46 as a fulcrum through the hinge mechanism 45. In the opening/closing of the second door panel 22 through the hinge mechanism 45, the first door panel 21 follows the opening/closing of the second door panel 22 in a state in which the first door panel 21 is overlapped with the second door panel 22. As illustrated in FIG. 10, the second door panel 22 can be opened substantially at a right angle with respect to the front-rear direction of the vehicle body 11, and if the second door panel 22 is opened substantially at a right angle, the second door opening region 13B is fully opened, and the rear door opening 13 is brought into the fully open state.

If the second door panel 22 in the fully open state is closed and the second door opening/closing restricting mechanism 50 restricts opening/closing of the second door panel 22 with respect to the vehicle body 11, the connection between the first door panel 21 and the second door panel 22 by the slide restricting mechanism 52 can be cancelled by means of operation of the outer handle 48. After the connection by the slide restricting mechanism 52 is cancelled, the fully closed state in which the first door panel 21 closes the first door opening region 13A is brought about by sliding the first door panel 21 forward.

This embodiment has the following advantages.

(1) The first guide body 26 guided by the upper slide rail 23 and the second guide body 30 guided by the intermediate slide rail 40 are located on both sides of the center of gravity G of the first door panel 21 in the sliding direction of the first door panel 21 and moreover, the third guide body 34 supports the first door panel 21. Thus, the moment generated in the first door panel 21 can be received not only by the second door panel 22 but also by the vehicle body 11. Thus, there is no need to reinforce the intermediate slide rail 40 and the second door panel 22 in order to reliably receive the moment but as a result, a weight increase of the intermediate slide rail 40 and the second door panel 2 caused by such reinforcement can be prevented. When the first door panel 21 is in the fully open state, the first guide body 26 is in the removed state or removable state from the upper slide rail 23, and thus, the second door panel 22 is capable of axial rotation through the hinge mechanism 45 together with the first door panel 21. Also, even if the first door panel 21 is in the state of beginning to be opened, the moment caused by the weight of the first door panel 21 can be successfully received by the second door panel 22 and the vehicle body 11. Also, even if a moment generated by the external force from the vehicle interior to the outside of the vehicle body 11 acts on the first door panel 21, the moment can be successfully received by the second door panel 22 and the vehicle body 11.

(2) When the first door panel 21 is in the fully open state, the first door panel 21 and the second door panel 22 are connected to each other by the slide restricting mechanism 52. As a result, even if the first guide body 26 is brought into the removed state or removable state from the upper slide rail 23, the first door panel 21 is prevented from separating from the second door panel 22 in a direction at a right angle to the sliding direction thereof.

(3) When the first door panel 21 is fully open, the positioning pin 55 is inserted through the pin receiving hole 56. As a result, even if the first guide body 26 is brought into the removed state or removable state from the upper slide rail 23, the first door panel 21 is prevented from separating from the second door panel 22 in a direction at a right angle to the sliding direction thereof.

(4) Since the slide restricting mechanism 52, which restricts the sliding movement of the first door panel 21 with respect to the second door panel 22, is provided, the sliding movement of the first door panel 21 with respect to the second door panel 22 can be prevented during opening/closing of the second door panel 22.

(5) The first guide body 26 of the first door panel 21 is guided by the upper slide rail 23 provided in the vehicle body 11, the third guide body 34 is guided by the lower slide rail 42 provided in the vehicle body 11, and the second guide body 30 is guided by the intermediate slide rail 40 provided in the second door panel 22. Therefore, since the upper and lower portions of the first door panel 21 are supported by the vehicle body 11 through the first and third guide bodies 26 and 34, stability of the first door panel 21 with respect to the vehicle body 11 is improved during opening/closing of the first door panel 21.

Subsequently, a vehicle door structure according to a second embodiment of the present invention will be described.

This embodiment is different from the first embodiment in a point that the lower slide rail 42 as the third slide rail of the slide mechanism is formed in the second door panel 22. In this embodiment, the members common with those in the first embodiment are given the same reference numerals as those in the first embodiment, and the description thereof will be omitted.

Figure 11:
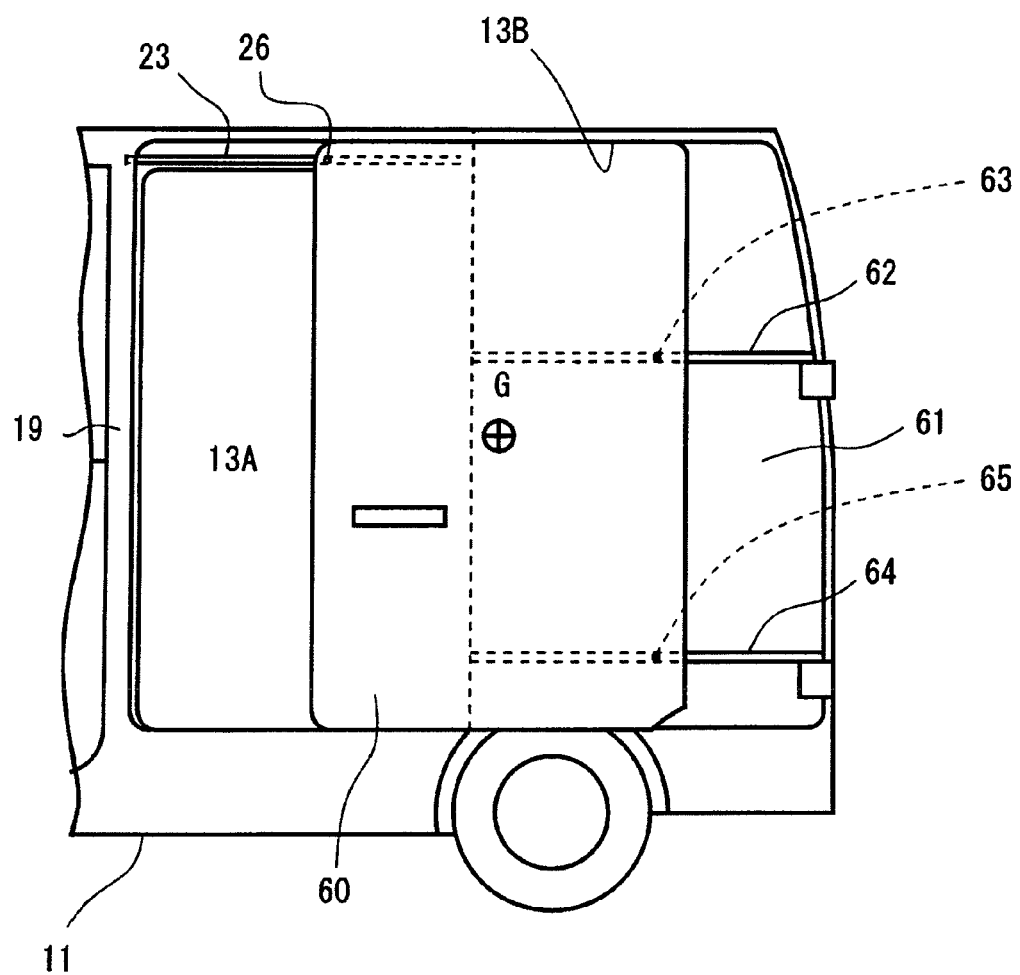
FIG. 11 is a side view of a vehicle provided with a vehicle door structure according to a second embodiment of the present invention.

The vehicle door structure according to this embodiment is provided, as illustrated in FIG. 11, with a sliding opening/closing type first door panel 60 and a swing opening/closing type second door panel 61. In the vehicle door structure of this embodiment, an intermediate slide rail 62 as a second slide rail and a lower slide rail 64 as a third slide rail are provided in the second door panel 61. The intermediate slide rail 62 has substantially the same configuration as that of the intermediate slide rail 40 in the first embodiment and has a rail upper face portion, a rail lower face portion, a rail side face portion, and a rail outer edge portion, though not shown. The second guide body 63 guided by the intermediate slide rail 62 has the same configuration as that of the second guide body 30 of the first embodiment and is provided at the distal end of an intermediate arm (not shown) provided in the second door panel 61. The second guide body 63 is provided with a radial roller (not shown) and a thrust roller (not shown) rolling in the intermediate slide rail.

The lower slide rail 64 has the same configuration as that of the intermediate slide rail 62, and the third guide body 65 guided by the lower slide rail 64 has the same configuration as that of the second guide body 63. Therefore, the first door panel 60 is connected to the vehicle body 11 through the first guide body 26 and also connected to the second door panel 61 through the second guide body 63 and the third guide body 65.

In the state in which the first door panel 60 begins to be opened, the first guide body 26 is located in the front of the center of gravity G of the first door panel 60, and the second guide body 63 and the third guide body 65 are located in the rear of the center of gravity G. Thus, the moment generated by the weight of the first door panel 60 can be successfully received by the vehicle body 11 and the second door panel 61.

In this embodiment, the first door panel 60 can be fully opened by sliding movement, and the second door panel 61 can be opened and closed when the first door panel 60 is fully open. Also, the first guide body 26 of the first door panel 60 is guided along the upper slide rail 23 provided in the vehicle body 11. The second guide body 63 is guided by the intermediate slide rail 62 provided in the second door panel 61, and the third guide body 65 is guided by the lower slide rail 64 provided in the second door panel 61.

The upper part of the first door panel 60 is supported by the vehicle body 11, and the intermediate part and the lower part of the first door panel 60 are supported by the second door panel 61, and thus, stability of the first door panel 60 with respect to the second door panel 61 during opening and closing of the first door panel 60 is improved. Also, since there is no need to provide a lower slide rail in the vehicle body 11, a space for installing the lower slide rail in the vehicle body 11 can be saved, and a floor in the vehicle interior can be lowered.

Subsequently, a vehicle door structure according to a third embodiment of the present invention will be described.

In the above-described first embodiment, if the first door panel 21 is in the fully open state and the second door panel 22 is in the fully closed state, the first guide body 26 is in the state not removed from the upper slide rail 23 (however, in a removable state). On the other hand, in this embodiment, if the first door panel 70 is in the fully open state and the second door panel 71 is in the fully closed state, a first guide body 73 guided by an upper slide rail 72 as the first slide rail is in a fully removed state from the upper slide rail 72. In this embodiment, the members common to those in the first embodiment are given the same reference numerals as those in the first embodiment, and the description will be omitted.

Figure 12:
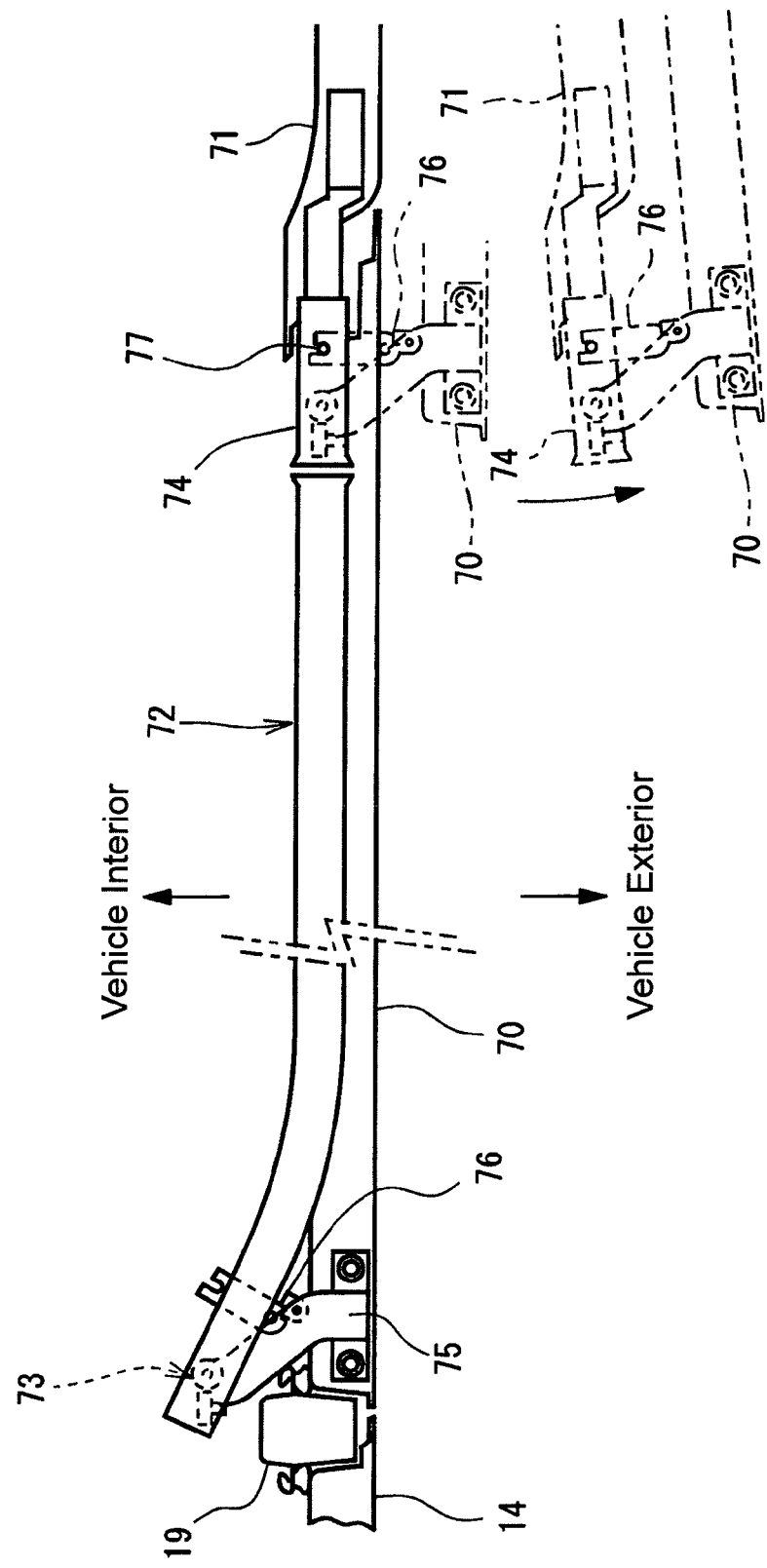
FIG. 12 is a perspective view illustrating an essential part of a vehicle door structure according to a third embodiment of the present invention.

The vehicle door structure according to this embodiment is provided, as illustrated in FIG. 12, with the sliding opening/closing type first door panel 70 and the swing opening/closing type second door panel 71. The upper slide rail 72 as the first slide rail is provided on a roof side rail ceiling portion of the vehicle body 11 along the upper part of the first door panel 70 in the fully closed state. The upper slide rail 72 guides the first guide body 73 provided at the distal end of an upper arm 75 of the first door panel 70 and restricts the movement of the first guide body 73 in the up-down direction and the left-right direction. Though not particularly shown, the upper slide rail 72 is provided with a rail upper face portion, a rail lower face portion, a rail side face portion, and a rail outer edge portion similarly to the upper slide rail 23 in the first embodiment, and the shape of a cross-section is a channel shape.

The longitudinal direction of the upper slide rail 72 matches the front-rear direction of the vehicle body 11, the front end of the upper slide rail 72 is located in the vicinity of the pillar 19, and the rear end of the upper slide rail 72 is located in the vicinity of the front edge end of the second door panel 71. In the rear of the rear end of the upper slide rail 72, a second door side slide rail 74 is fixed to the second door panel 71. The second door side slide rail 74 guides the first guide body 73 having been removed from the rear end of the upper slide rail 72 and also restricts the movement of the first guide body 73 in the up-down direction and in the left-right direction of the vehicle body 11 with respect to the second door panel 71. Thus, the second door side slide rail 74 corresponds to a connection lock mechanism which restricts separation of the first door panel 70 from the second door panel 71 in a direction at a right angle to the sliding direction when the first door panel 70 is fully open.

In this embodiment, the slide restricting mechanism, which restricts the sliding movement of the first guide body 73 in the second door side slide rail 74 in the front-rear direction of the vehicle body 11, is provided. The slide restricting mechanism is provided with a lock plate portion 76 provided in the upper arm 75 and a lock pin 77 provided in the second door side slide rail 74. By sliding the first door panel 70 with respect to the second door panel 71 until the first door panel 70 is fully opened, the lock plate portion 76 is held by the lock pin 77, and the sliding movement of the first guide body 73 in the front-rear direction of the vehicle body 11 is restricted. The restricting of the sliding movement of the first guide body 73 by the slide restricting mechanism is cancelled by the outer handle and the inner handle for opening and closing the first door panel 70, though not shown.

In this embodiment, if the first door panel 70 is brought into the fully open state, the first guide body 73 is removed from the upper slide rail 72 and transfers to the second door side slide rail 74, and the sliding movement of the first guide body 73 is restricted by the slide restricting mechanism. While the first guide body 73 is restricted by the slide restricting mechanism, the second door panel 71 can be opened.

The present invention is not limited by the above embodiments but is capable of various changes as follows within a range of the gist of the present invention.

In the first to third embodiments, the vehicle door structure of the present invention is applied to a vehicle door structure that opens/closes the rear door opening formed on the side portion of the vehicle body, but an application position of the vehicle door structure of the present invention to the vehicle body is not particularly limited. For example, the present invention may be applied to a door structure that opens/closes a rear side opening formed on the rear face of the vehicle body.

In the first and second embodiments, the weight of the first door panel can be supported by the radial rollers provided in the first to third guide bodies, but in the first embodiment, for example, the radial rollers 32 and 37 are provided only in the second guide body 30 and the third guide body 34 so that the weight of the first door panel 20 is distributed and supported by the radial rollers 32 and 37. Alternatively, the radial rollers 32 and 37 may be provided only on the first guide body 26 and the second guide body 30 so that the weight of the first door panel 20 is supported by the radial rollers 32 and 37. In the second embodiment, the radial rollers 28 and 32 may be provided only on the first guide body 26 and the second guide body 63 so that the weight of the first door panel 60 is distributed and supported by the radial rollers 28 and 32. Also, in the second embodiment, radial rollers guided by the slide rails provided at least in the vehicle body 11 are preferably provided on both sides of the center of gravity G of the first door panel 60 in the sliding direction of the first door panel 60 so that the weight of the first door panel 60 is supported by the radial rollers.

In the third embodiment, the second door side slide rail 74 is provided in the rear of the rear end of the upper slide rail 72, but if the lower slide rail 42 is provided on the lower part of the vehicle body 11, the second door side slide rail similar to the second door side slide rail 72 is preferably provided in the rear of the rear end of the lower slide rail 42. In this case, each upper and lower guide body of the first door panel 70 is held by the corresponding second door side slide rails, and the first door panel 70 is further stably held with respect to the second door panel 71.

In any of the first to third embodiments, three slide rails including the upper slide rail, the intermediate slide rail, and the lower slide rail and three guide bodies guided by each of the slide rails are provided. However, the slide rails may be used only as the first slide rail provided in the vehicle body 11 and the second slide rail provided in the second door panel. In that case, for example, it may be so configured that the first slide rail is extended to the upper part of the second door panel and the first guide body moving along the first slide rail is provided at the front edge end and the rear edge end of the first door panel, respectively, so that the first door panel is supported by the two first guide bodies and the one second guide body moving along the second slide rail. Alternatively, corresponding three or more guide bodies are preferably provided for the first and second slide rail, respectively, so that the first door panel is supported by these guide bodies, and the sliding of the first door panel is stabilized. In this case, in the first slide rail, a cutout rail part is provided corresponding to each of the position of a plurality of the first guide bodies in the case in which the first door panel is brought into the fully open state. Also, the second slide rail is preferably provided at the position opposite to the first slide rail in the second door panel with respect to the center of gravity G of the first door panel.

In the first to third embodiments, car models to which the vehicle door structure is applied are not specifically specified, but vehicles to which the present invention is applied may be passenger automobiles having three rows of seats, or cargo vehicles having a luggage compartment for cargo transportation. In the case of the passenger automobiles, a passenger can board and alight without moving the seats of the last row by fully opening the first and second door panels. In the case of cargo vehicles, even a large piece of luggage, which previously required that a back door be opened and closed for loading and unloading, can be loaded and unloaded without opening and closing the back door.

DESCRIPTION OF THE REFERENCE NUMERALS

G Center Of Gravity Of First Door Panel
11 Vehicle Body
13 Rear Door Opening
13A First Door Opening Region
13B Second Door Opening Region
21, 60, 70 First Door Panel
22, 61, 71 Second Door Panel
23, 72 Upper Slide Rail (First Slide Rail)
26, 73 First Guide Body
30, 63 Second Guide Body
34, 65 Third Guide Body
40, 62 Intermediate Slide Rail (Second Slide Rail)
42, 64 Lower Slide Rail (Third Slide Rail)
45 Hinge Mechanism
50 Second Door Opening/Closing restricting Mechanism
51 First Door Opening/Closing restricting Mechanism
52 Slide restricting Mechanism
55 Positioning Pin (Connection Lock Mechanism)
56 Pin Receiving Hole (Connection Lock Mechanism)
74 Second Door Side Slide Rail
76 Lock Plate Portion
77 Pin.

The invention claimed is:

1. A vehicle door structure comprising:
a first door panel for opening and closing a part of a door opening formed in a vehicle body;
a second door panel for opening and closing the whole of the door opening in collaboration with the first door panel;
a slide mechanism for sliding the first door panel with respect to the second door panel; and
a hinge mechanism for supporting the second door panel such that the second door panel is capable of axial rotation with respect to the vehicle body, wherein
in a fully open state of the first door panel, the first door panel is arranged to overlap the second door panel,
the slide mechanism includes:
a first slide rail provided in the vehicle body to extend along an upper part or a lower part of the first door panel in a fully closed state of the first door panel;
a first guide body provided in the first door panel and guided by the first slide rail;
a second slide rail provided in the second door panel; and
a second guide body provided in the first door panel and guided by the second slide rail,
the first slide rail includes a side wall for guiding sliding motion of the first guide body, and
a cutout for allowing removal of the first guide body is formed in the side wall such that, when the first door panel is in the fully open state, the first guide body is in a removable state from the first slide rail,
wherein the first guide body and the second guide body are located on opposing sides of a center of gravity of the first door panel, wherein one of the first guide body and the second guide body is below the center of gravity and the other of the first guide body and the second guide body is above the center of gravity is not shown by the prior art of record.

2. The vehicle door structure according to claim 1, wherein the first guide body is provided at a front edge end of the first door panel.

3. The vehicle door structure according to claim 1, further comprising a connection lock mechanism that connects the first door panel and the second door panel to each other, wherein, when the first door panel is in the fully open state, the connection lock mechanism restricts separation of the first door panel from the second door panel in a direction perpendicular to the sliding direction.

4. The vehicle door structure according to claim 1, further comprising a slide restricting mechanism that restricts sliding movement of the first door panel with respect to the second door panel when the second door panel is opened.

5. The vehicle door structure according to claim 1, wherein the first slide rail is provided in the vehicle body to extend along the upper part of the first door panel in the fully closed state, the vehicle door structure further comprising:
a third slide rail provided below the second slide rail; and
a third guide body provided in the first door panel and guided by the third slide rail.

6. The vehicle door structure according to claim 5, wherein the third slide rail is provided in the vehicle body to extend along the lower part of the door opening, and
when the first door panel is in the fully open state, the third guide body is in a state removed from the third slide rail or in a removable state.

7. The vehicle door structure according to claim 5, wherein the third slide rail is provided in the second door panel.

8. The vehicle door structure according to claim 1, wherein the first slide rail is adapted to restrict the movement of the first guide body in the up-down direction when the first door panel is in the fully closed state of the first door panel.

* * * * *